United States Patent [19]

Raudman

[11] 4,280,736

[45] Jul. 28, 1981

[54] VEHICLE WHEEL

[76] Inventor: Charles J. Raudman, 4480 Vechelli La., Redding, Calif. 96001

[21] Appl. No.: 42,007

[22] Filed: May 24, 1979

[51] Int. Cl.³ .......................... B60B 1/08; B60B 5/02
[52] U.S. Cl. .................. 301/6 CS; 301/6 R; 301/6 V; 301/90 P; 301/63 PW; 301/64 SD; 301/65
[58] Field of Search ...................... 301/1-2, 301/2.5, 6 R, 6 CS, 6 A, 6 S, 6 V, 63 PW, 64 R, 64 SD, 65-66, 79, 105 B, 9 DP; 188/18 R, 18 A; 403/348-349; 29/159.03, 159.3; 74/230.1, 230.9, 230.4; D12/204-205, 207, 209-211; 192/6 R

[56] References Cited

U.S. PATENT DOCUMENTS

| | | | |
|---|---|---|---|
| D. 244,272 | 5/1977 | Daudman, Jr. et al. | D12/205 |
| 361,914 | 4/1887 | Wing | 301/65 |
| 1,414,661 | 5/1922 | Morgan . | |
| 2,208,525 | 7/1940 | Eksergian . | |
| 2,943,889 | 7/1960 | Woldring et al. | 301/63 |
| 2,948,055 | 8/1960 | Baxter et al. | 301/64 R X |
| 3,256,964 | 6/1966 | Dotter . | |
| 3,640,584 | 2/1972 | Soloman | 301/63 PW |
| 3,862,779 | 1/1975 | Jayne | 301/63 PW X |
| 3,894,776 | 7/1975 | Black | 301/63 PW X |
| 4,118,073 | 10/1978 | Marwitz | 301/6 CS |
| 4,173,374 | 11/1979 | Resele et al. | 301/6 CS |

FOREIGN PATENT DOCUMENTS 5804 of 1901 United Kingdom ................ 74/230.4

*Primary Examiner*—Charles A. Marmor
*Attorney, Agent, or Firm*—Freilich, Hornbaker, Wasserman, Rosen & Fernandez

[57] ABSTRACT

A molded plastic wheel and brake assembly for a bicycle or other vehicle, which aids in isolating a bicycle frame from shocks encountered by the wheel and in isolating the plastic material of the wheel from extreme heating by the brake assembly. The wheel includes a hollow cylindrical hub and five spoke ribs extending radially from the outside of the hub to the rim. Tabs for holding the brake assembly, are formed on the inside of the hollow hub, with each tab located halfway between a pair of spoke ribs, so that the hub portion connecting a pair of ribs acts as a resilient beam to help absorb shock. The brake assembly includes a metal cylinder with lugs at its ends that mount on the tabs of the wheel, to provide an elongated heat path for the transmission of heat to the wheel and to provide an air space between the lugs for dissipating heat.

4 Claims, 4 Drawing Figures

VEHICLE WHEEL

BACKGROUND OF THE INVENTION

A typical bicycle wheel is formed completely of metal, and includes a cylindrical hub connected by numerous metal spokes to a rim, and an axle assembly that may include a brake lying within the hub. Improved performance of bicycle wheels has been obtained by using molded plastic wheels formed of very high strength plastic material. Design of the wheel for injection molding results in a different type of wheel, wherein a limited number of heavy duty spokes are preferably utilized. U.S. Pat. No. Des. 244,272 by Raudman and Hoffman show a wheel of this type. While high performance plastics have many advantages, one important disadvantage is that they are easily damaged by heat, such as that which can be generated by a bicycle brake when repeatedly applied. Also, the limited number of heavy duty spokes in a molded plastic wheel, can result in poor absorption of shocks when applied along the axis of one of the heavy duty spokes. The limited number of spokes also can have disadvantages in providing a large open space into which a child's foot may be inserted. A molded plastic vehicle wheel, especially one designed for use on bicycles, which helps minimize the transmission of shock between the rim of the wheel and the bicycle frame, and which minimizes the possibility of heat damage to the wheel by a brake assembly mounted in the hub of the wheel, would be of considerable value in the production of bicycles as well as other vehicles.

SUMMARY OF THE INVENTION

In accordance with one embodiment of the present invention, a vehicle-wheel assembly is provided which minimizes the transmission of shock, which can include an easily installed brake assembly, and that minimizes the possibility of damage to the molded wheel from braking heat. The wheel assembly includes a molded plastic wheel having a hollow cylindrical hub connected by several spoke ribs to the rim, and several tabs lying within the hub to support a metal axle assembly. Each tab is located halfway between a pair of ribs, so that shocks applied along the length of the radially-extending spoke ribs are absorbed by flexure of a beamlike hub portion that connects the spoke ribs to the tabs. The axle assembly can include a brake that generates heat and a brake housing with several lugs at each end that mount on the tabs. The lugs provide an elongated path for the transfer of heat from the brake assembly to the tab, and also provide an open air space between the tabs, to minimize the transference of heat to the plastic wheel and to provide air circulation to aid in dissipating heat. The tabs and axle assembly lugs are formed so that the lugs can pass between the tabs to facilitate installation of a complete axle assembly on the wheel.

The plastic wheel can be formed with radially-extending spoke ribs of cruciform cross section to transmit most of the load between the rim and hub of the wheel, and can also include Y-shaped bracing structure formed in the spaces between the spoke ribs. Each bracing structure has an arm extending radially inwardly from the rim and two additional arms extending apart and intersecting the spoke ribs. The Y-shaped bracing structures not only strengthen the rim at locations between the spoke ribs, but also fill the holes between the spoke ribs to help avoid injury to children who might otherwise place their feet in the holes.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
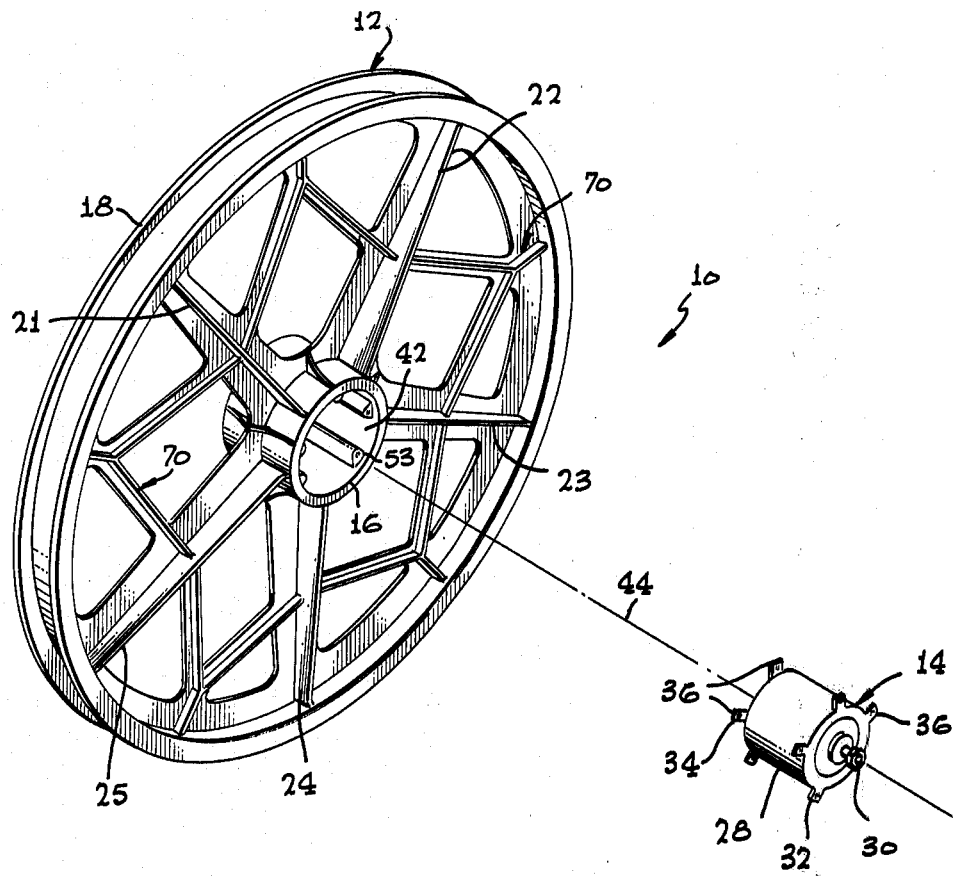
FIG. 1 is an exploded perspective view of a wheel assembly constructed in accordance with one embodiment of the present invention.
Figure 2:
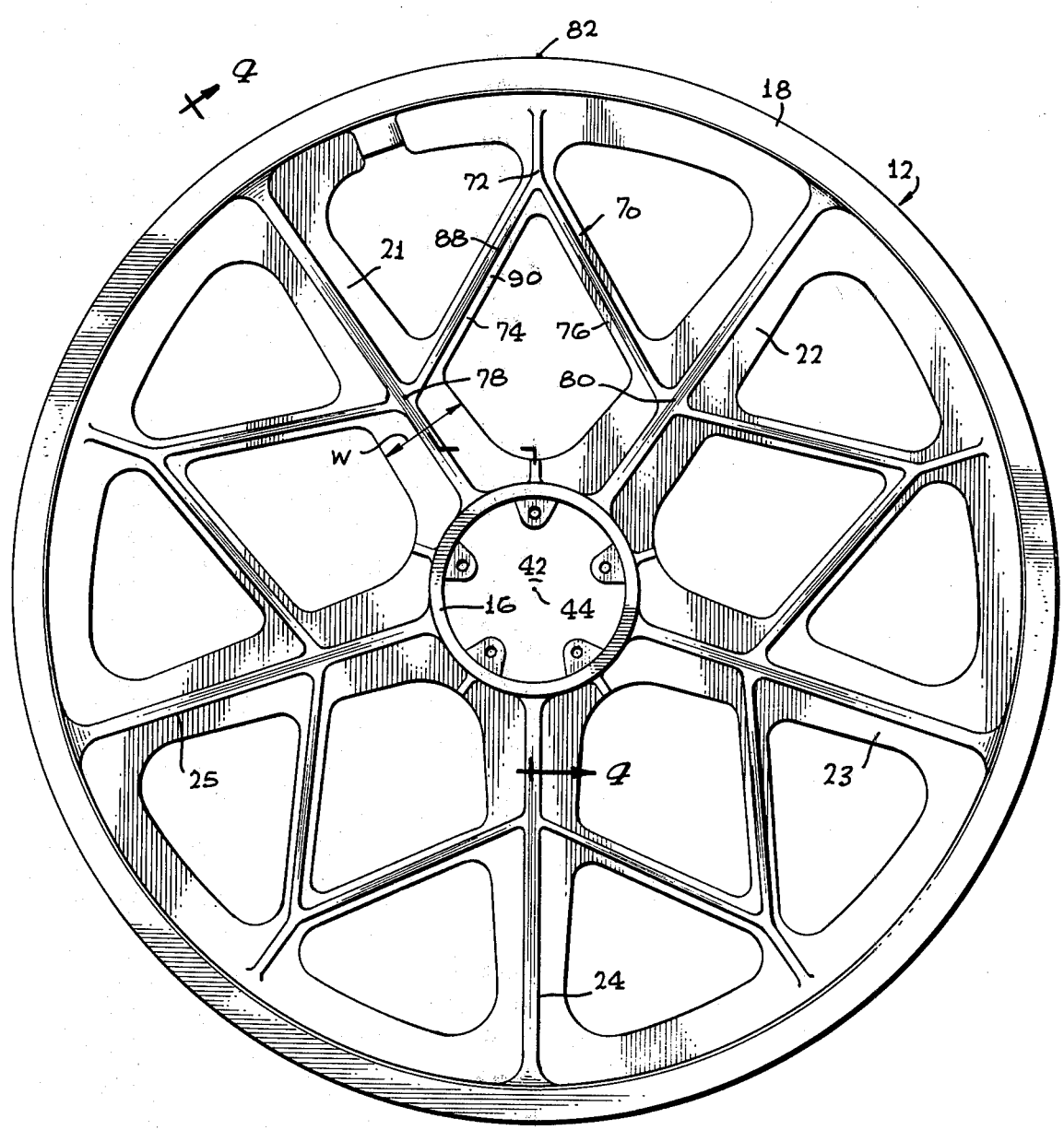
FIG. 2 is a front elevation view of the wheel of the assembly of FIG. 1.

FIG. 1 illustrates a vehicle wheel assembly 10 which includes a molded plastic wheel 12 and an axle assembly 14 that can fit in the wheel, the particular axle assembly 14 being the type which includes a coaster brake. The wheel 12 includes a hollow cylindrical hub 16, a rim 18 designed to hold an inflatable tire, and five main spoke ribs or spokes 21–25 extending radially between the hub and rim to connect them. The axle assembly 14 is formed of metal, and includes a cylindrical housing 28, an axle 30 with ends extending from the housing, and a brake mechanism (not shown) of a conventional coaster brake type. The brake housing 28 includes flanges 32, 34 at its opposite ends, with each flange being divided into angularly-spaced lugs 36.

Traditional bicycle wheels are formed with a large number of metal wire spokes for connecting the hub and rim, with the spokes being stressed only in tension in transmitting force between the hub and rim. The tensile strength of a large number of thin metal spokes is high, particularly since the unit tensile strength of steel wire can be even greater than that of large diameter steel rods. In the construction of a plastic molded wheel, the use of numerous thin plastic spokes is not practical, and the wheel shown in FIGS. 1–4 utilizes only five radially-extending thick spokes 21–25 that can transmit rim-to-hub forces also by axial compression of the spokes. The strength of a long rib spoke such as 21 in compression along its length, can be dependent upon the column strength of the spoke; that is, the strength of the spoke against buckling when loaded in compression along its length. The column strength of the spokes increases greatly with increases in the thickness of the spoke, and therefore a limited number of spokes 21–25 that are each of considerable width, are provided to connect the rim and hub of the wheel, there preferably being no more than about ten spokes and five spokes being sufficient.

Figure 3:
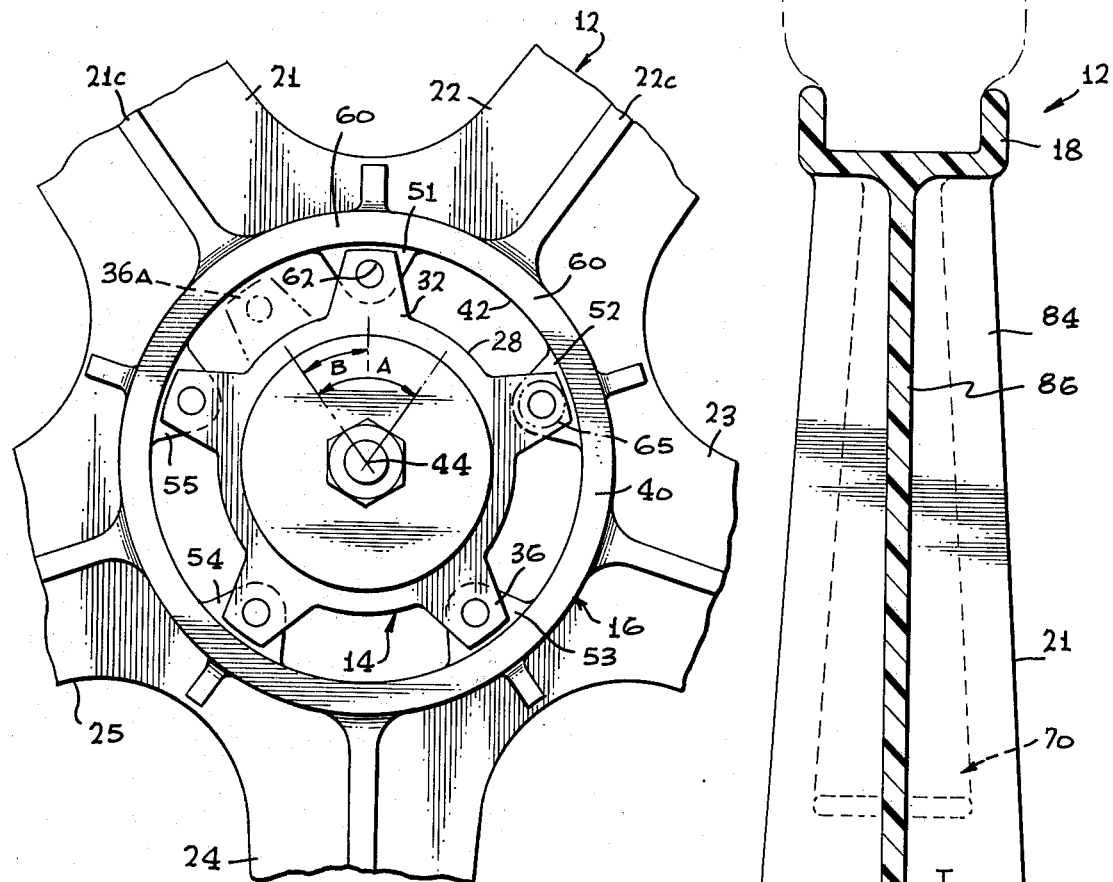
FIG. 3 is a front elevation view of the hub portion of the wheel assembly of FIG. 1, showing the wheel and brake assembly thereof in an assembled configuration.

The limited number of spokes 21–25 that are each of relatively great circumferential width W (FIG. 2) and axial thickness T (FIG. 4), could result in the transmission of shock between the rim and hub, and from there to the bicycle frame, without substantial shock absorption. Such shocks can be large, as when the portion of the rim directly under the spoke 24 of FIG. 2 hits a bump in the road. The hub 16, best shown in FIG. 3, is constructed to aid in the absorption of such shocks. The hub 16 includes a hollow cylindrical region 40 forming a large hole 42 which is centered on the axis 44 of the wheel. Five tabs 51-55 are formed at the inside of the cylindrical region 40 to mount the lugs such as 36 of the axle assembly 14 on the wheel 12. Each of the tabs such as 51 is located halfway between the centers such as 21c and 22c of a pair of adjacent spokes 21, 22. That is, while a pair of adjacent spokes 21, 22 are angularly spaced by an angle A of 72° in the case of a wheel with five spokes, the tab 51 is spaced by an angle B of 36° from the center of each adjacent spoke such as 21. As a result, the beam-like portion 60 of the hub cylinder which connects the centers 21c, 22c of adjacent spokes, acts as a bendable beam that can absorp some of the shock that would otherwise be transmitted from a spoke such as 21 to a tab such as 51. This shock absorption by bending of the beam portion 60 helps to minimize the transmission of shock between the rim and hub, especially for those shocks which may be applied to the rim at the time that a spoke such as 21 lies directly over the ground and the shock would all be transmitted through that single spoke.

Where the axle assembly 14 includes a brake mechanism, considerable heat can be generated. Such heat is easily tolerated by metal parts such as the housing 28 of the axle assembly and the hubs of prior art metal wheels. However, plastic injection molded wheels are constructed of material that can be damaged when subjected to moderate braking temperatures such as about 500° F. that can be generated when brakes are repeatedly applied as to slow a bicycle along a long downgrade. The hub 16 of the wheel aids in dissipating the braking heat and in minimizing transference of heat to the plastic material of the wheel 12. The lugs such as 36 at the ends of the axle assembly 14 provide a relatively thin and long path for the conduction of heat from the axle assembly housing 28 to the plastic tabs such as 51 of the molded wheel. In addition, the considerable space between the inside walls or hole 42 of the wheel hub and the outside of the axle assembly cylinder 28, provides an air space through which air can circulate to help dissipate heat from the brake assembly.

Figure 4:
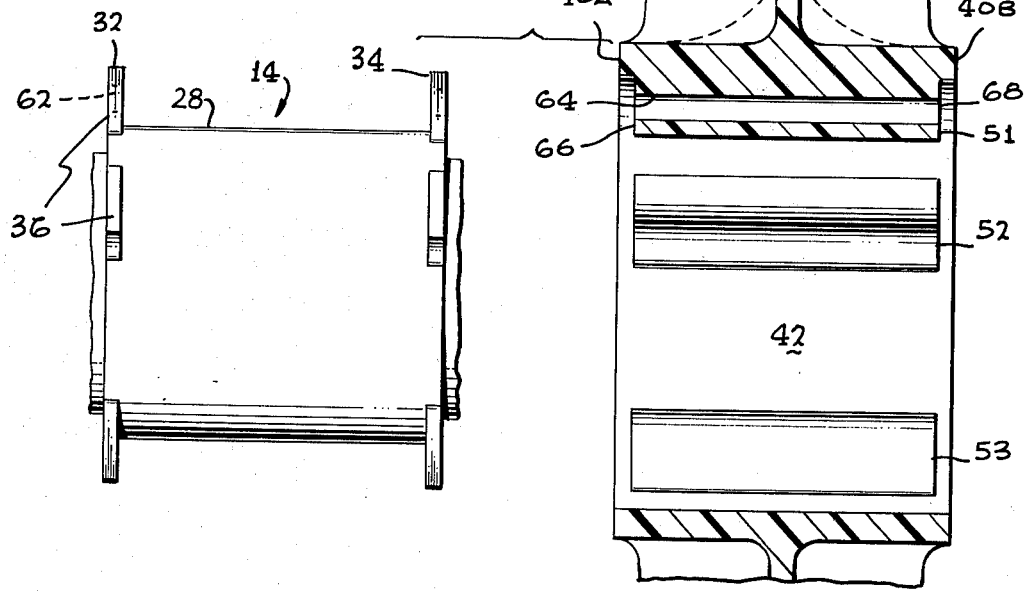
FIG. 4 is a partial exploded sectional view of the wheel assembly, taken on the line 4—4 of FIG. 2.

The construction of the axle assembly 14 and the hub portion 16 of the wheel which aids in the dissipation of heat, also facilitates the installation of the axle assembly 14. The circumferential width of the space between adjacent tabs such as 51, 55 of the hub, is larger than the width of the lugs 36 of the axle assembly. Accordingly, the axle assembly 14 can be installed by turning it until the lugs are at positions such as indicated at 36A in FIG. 3, so the lugs can pass axially through the hub. The cylinder 28 of the axle assembly is slightly smaller than the space within the wheel tabs 51-55, so that the cylinder 28 easily passes axially through the wheel hub, and so that the cylinder 28 is out of close thermal contact with the tabs. After the lugs such as 36 at one end of the axle assembly have passed through the wheel, the axle assembly 14 is turned so that the lugs such as 36 are aligned with the tabs such as 51. Both the lugs 36 and tabs 51-55 have holes 62, 64 to receive a fastener such as a bolt or rivet type indicated at 65. As can be seen in FIG. 4, each of the bar-like tabs such as 51 on the wheel, extends through most of the axial length of the wheel, but is recessed at its ends 66, 68 from the axial ends 40A, 40B of the hub. The lugs 36 on the axle assembly 14 have a thickness approximately equal to the depth of recessing at 66, 68, so that when the axle assembly is installed the lugs on flanges 32, 34 are substantially flush with the axial end portions 40A, 40B of the wheel.

Although it is possible to utilize only the spokes 21-25 to connect the rim and hub of the wheel, it has been found desirable in many applications to include a Y-shaped bracing structure 70 (FIG. 2) in the spaces between the spokes. The Y-shaped structures 70 help fill the spaces between spokes so as to avoid injury to children who might otherwise insert their feet into the space, and also strenthen the molded wheel. Each Y-shaped bracing structure 70 includes one arm 72 that extends in a radial direction inwardly from the hub 18, and a pair of additional arms 74, 76 that extend in partially radial direction to intersect a pair of adjacent spokes 21, 22 at the locations 78, 80. The three-armed bracing structure 70 divides the space between a pair of adjacent spokes such as 21, 22 into three almost equal spaces. In one wheel 12 which has been designed for a nominally 18 inch bicycle wheel, the size of the opening between a pair of spokes such as 21, 22 was about six inches in the absence of the bracing structure 70. This opening is sufficient for a child to easily insert his foot into the space and cause injury to the child. With the bracing structure 70 in place, the maximum opening width is only about 3 inches, which greatly reduces the possibility of a child inserting his foot into the wheel. The bracing structure 70 strengthens the wheel by better supporting regions of the rim 18 which lie halfway between a pair of adjacent spokes such as 21 and 22. For example, if the wheel is rotated until the location at 82 along the rim is lowermost, so that forces from the ground are initially applied at the location 82 (after passing through a tire), then in the absence of the bracing structure 70, the rim will have to have sufficient beam strength to transmit the forces to the adjacent spokes 21, 22. Although such beam-like bending of the rim portion can help absorb shock, it can also lead to failure of the rim portion if a large shock is encountered at the location 82, such as if a large bump is hit while a bicycle is travelling at considerable speed. The bracing structure 70 helps to transmit forces applied at the location 82 to the spokes 21, 22, to strengthen the wheel.

Both the spokes such as 21 and each of the arms such as 74 of the bracing structure, are of cruciform shape. Each spoke such as 21 includes an axially-extending web 84 (FIG. 4) and a circumferentially extending web 86. Similarly, each arm such as 74 (FIG. 2) includes an axially-extending web 88 and a circumferentially-extending web 90. This construction provides considerable column strength for the spokes and arms, since the buckling strenth of a column depends upon the width of the column. In addition, this construction facilitates molding of the wheel, since it is desirable to utilize relatively thin sections in injection molding to facilitate relatively uniform cooling of all parts of the molded item.

Thus, the invention provides a vehicle wheel assembly of a type that includes a molded plastic wheel, which has high shock absorbing and heat resisting properties. This is accomplished by utilizing tabs for holding an axle assembly, wherein the tabs are located halfway between a pair of adjacent spokes that connect the hub and rim of the wheel, so that the hub portion which connects a pair of spokes can flex somewhat like a beam to help absorb shock. The axle assembly is provided with flanges at its opposite ends, and with the flanges divided into separate lugs that mount on the tabs. The lugs are formed to fit between the tabs to facilitate installation of the axle assembly, and the lugs provide a poor heat path for resisting the transference of heat to the molded wheel while providing an air space for dissipation of heat in the case of a brake type axle assembly. In addition to several spokes, the molded wheel is formed with Y-shaped bracing structures that fill the space between adjacent spokes to help avoid injury to children and to help brace the rim of the wheel at regions between spokes.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. A vehicle wheel and hub assembly comprising:
   a molded vehicle wheel having a hub with an axially-extending hole for receiving a hub assembly, said hub having a plurality of fastener-receiving tabs angularly spaced about the inside of the hole;
   a hub assembly which includes a housing lying in said wheel hole, said housing having a pair of axially opposite ends with each end forming flange means for fastening to said tabs, and with said housing flange means being constructed as a unit which holds together independently of said wheel; and
   fastener means for fastening said hub assembly flange means to said tabs;
   said molded wheel has a rim and a plurality of spokes extending radially between said hub and rim, each of said spokes being of cruciform cross-section with an axially-extending web (84) extending along the center of the spoke as viewed along the axis of the wheel;
   said hub includes a largely hollow cylindrical portion having an outer surface connected to said spokes and an inner surface connected to said tabs; and
   each of said tabs is located halfway between the radially inner ends of the axially-extending webs of a pair of adjacent spokes, whereby to help absorb shocks transmitted radially along a spoke from the rim.

2. A vehicle wheel for receiving an axle assembly, comprising:
   a molded wheel including rim and hub portions, and a plurality of angularly-spaced spokes extending radially between said rim and hub portions, each spoke having an axially-extending web (84) extending along the center of the spoke as viewed along the axis of the wheel;
   said hub portion having a hole for receiving an axle assembly and having a plurality of fastener-receiving tabs angularly spaced about said hole to fasten to the axle assembly;
   said tabs angularly spaced from one another and being located angularly between said axially-extending webs of said spokes, said hub portion including beam regions extending between the radially inner ends of adjacent spokes, and each tab fixed to a corresponding beam region at a location approximately halfway between the axially-extending webs of adjacent spokes, whereby a shock applied radially along a spoke is partially absorbed by bending of a beam portion to minimize the application of the shock to an axle assembly that is mounted on the tabs.

3. A vehicle wheel and braking assembly, comprising:
   a molded wheel formed of a plastic-type material which can be damaged when subjected to moderate braking temperatures, said wheel including rim and hub portions, said hub portion having a hole for receiving an axle assembly and having a plurality of fastener-receiving tabs angularly spaced about said hole to fasten to the axle assembly; and
   an axle assembly having a housing and having an axle and brake mechanism within the housing, said housing being formed of metal and having lugs at its axially opposite ends thereof which lie over and fasten to said tabs, said lugs being each less than half the thickness of the tabs, whereby to help retard the flow of heat from the brake mechanism to the material of the molded wheel member.

4. The vehicle wheel described in claim 3 wherein:
   said housing of said axle assembly has a largely cylindrical housing portion which can pass through said hole in said hub portion within said tabs and is fastened to said lugs independently of said molded wheel, the lugs at at least one end of said housing are angularly spaced and formed so that each lug can pass through the space between a pair of tabs during insertion of the axle assembly through the hub hole, said lugs being rotatable to a final orientation to lie aligned with said tabs and said lugs and tabs having apertures which are aligned at said final orientation; and including
   a plurality of fasteners extending through aligned apertures in said lugs and tabs.

* * * * *